US006923592B2

(12) United States Patent
Crandall

(10) Patent No.: US 6,923,592 B2
(45) Date of Patent: Aug. 2, 2005

(54) BALL AND SOCKET ROLLERS LOAD LATCH MECHANISM

(75) Inventor: Duane L. Crandall, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/368,998

(22) Filed: Feb. 19, 2003

(65) Prior Publication Data

US 2004/0161293 A1 Aug. 19, 2004

(51) Int. Cl.[7] ................................................ F16C 11/00

(52) U.S. Cl. ....................... 403/127; 403/122; 403/135; 403/141; 403/142; 403/143

(58) Field of Search ................................ 403/122, 127, 403/135, 136, 137, 138, 141, 142, 143; 292/9, 163, 193, 252

(56) References Cited

U.S. PATENT DOCUMENTS 3,287,043 A * 11/1966 Delhase ......................... 292/9
3,809,002 A * 5/1974 Nagy et al.
4,508,296 A * 4/1985 Clark ......................... 403/143
4,597,354 A * 7/1986 Gelula ......................... 403/141
6,050,588 A * 4/2000 Kissack
2003/0190184 A1 * 10/2003 O'Brien et al. ............. 403/122

OTHER PUBLICATIONS

Merriam Webster's Collegiate Dictionary 2001, Merriam–Webster Inc., Tenth Edition, pp. 14 and 1230.*

Generic Wedge Block and Wedge Combination, in use commercially since at least Jan. 1, 2000.

* cited by examiner

*Primary Examiner*—Daniel P. Stodola
*Assistant Examiner*—Victor MacArthur
(74) *Attorney, Agent, or Firm*—Laura C. Hargitt

(57) ABSTRACT

A location control mechanism includes a striker having a preferably spherically shaped lock ball and a pair of mutually adjacent socket rollers, each socket roller having a complementing preferably hemispherically shaped semi-socket which collectively provide a single preferably spherically shaped lock socket when the rollers are appropriately rotated relative to each other. The striker is connected to a first component and the socket rollers are rotatably mounted to a second component, wherein the first and second components are positionally located relative to each other by action of the lock ball being trapped in the lock socket formed when the socket rollers have been appropriately rotated.

17 Claims, 4 Drawing Sheets

BALL AND SOCKET ROLLERS LOAD LATCH MECHANISM

TECHNICAL FIELD

The present invention relates to latching mechanisms for preventing relative movement of components in a plurality of mutually perpendicular dimensional axes. More particularly, the present invention relates to a load latch mechanism featuring a lock ball connected to one component which is receivable into a socket formed by rotation of rotatable rollers connected to another component.

BACKGROUND OF THE INVENTION

There is a ubiquitous need for location control mechanisms which reliably locate one component relative to another. For example, in automotive applications a door latch is used to hold a door closed relative to the frame, and a wedge block and wedge combination may be additionally used to prevent the door from twisting out of alignment with the frame during driving of the automobile.

A drawback of conventional wedge block and wedge combinations is that position control depends upon the depth of the wedge into its complementarily shaped wedge seat of the wedge block, and the component location control operates in only two mutually perpendicular dimensional axes.

What remains needed in the art is a location control mechanism having a simple and robust structure, featuring latch capability, and featuring an ability to control location of components along all three mutually perpendicular dimensional axes.

SUMMARY OF THE INVENTION

The present invention is a location control mechanism having a simple and robust structure, featuring latch capability, and featuring an ability to control location of components along all three mutually perpendicular dimensional axes, wherein the location control mechanism is in the form of a load latch mechanism featuring a lock ball connected to one component which is receivable into a lock socket formed by rotation of rotatable rollers connected to another component.

The load latch mechanism according to the present invention includes a striker having a preferably spherically shaped lock ball and a pair of mutually adjacent socket rollers, each socket roller having a complementing preferably hemispherically shaped semi-socket which collectively provide a single preferably spherically shaped lock socket when the rollers are appropriately rotated relative to each other. The striker is connected to a first component and the socket rollers are rotatably mounted to a second component, wherein the first and second components are positionally located in relation to each other by action of the lock ball being trapped in the lock socket.

Operatively, the socket rollers rotate about mutually parallel rotation axes between a socket open position and a socket closed position, and the striker approaches and recedes from the socket rollers along a striking axis which is perpendicular to the rotation axes. Initially, the lock ball of the striker is separated from the socket rollers, and the socket rollers are in a socket open position, whereat each semi-socket is freely open in the direction of the striking axis. As the striker moves toward the socket rollers, the lock ball contactingly interacts with the semi-sockets. This interaction causes the socket rollers to rotate such that the semi-sockets move into mutual complement, whereupon the socket rollers are at a socket closed position, whereat the lock socket is formed. Now, the lock ball is trapped in the lock socket, and the first and second components are located relative to each other and prevented from movement in at least two mutually perpendicular dimensional axes. Thereafter, the lock ball can recede from the socket rollers only if the socket rollers reverse rotate to so as to release the lock ball, whereupon the semi-sockets are again at the socket open position.

A number of features may be included. For example, the socket rollers can be asymmetrically shaped to interferingly abut each other and thereby automatically "self-bottom" so as to prevent over rotation when the semi-sockets mutually complement at the socket closed position. For another example, the socket rollers may each have an off-set rotation axis, so that as the socket rollers rotate they cam toward each other as the semi-sockets move into the socket closed position. For yet another example, the socket rollers may be selectively prevented from rotating when the semi-sockets have moved into the socket closed position, thereby providing three mutually perpendicular dimensional axes of relative movement prevention between the components, yet the lock ball may have joystick pivotability relative to the lock socket. Still further for example, the socket rollers may be splined so as to be gearingly engaged with each other, whereupon the socket rollers must rotate in unison. Finally for example, the striker may be configured in the form of a series of mutually spaced lock balls, wherein the lock balls serially engage periodically forming lock sockets as the socket rollers continually rotate over 360 degrees.

Accordingly, it is an object of the present invention to provide a load latch in the form of a lock ball and socket rollers combination, featuring latch capability, and featuring an ability to control location of components along all three mutually perpendicular dimensional axes.

This and additional objects, features and advantages of the present invention will become clearer from the following specification of a preferred embodiment.

DESCRIPTION OF THE PREFERRED EMBODIMENT

Figure 1:
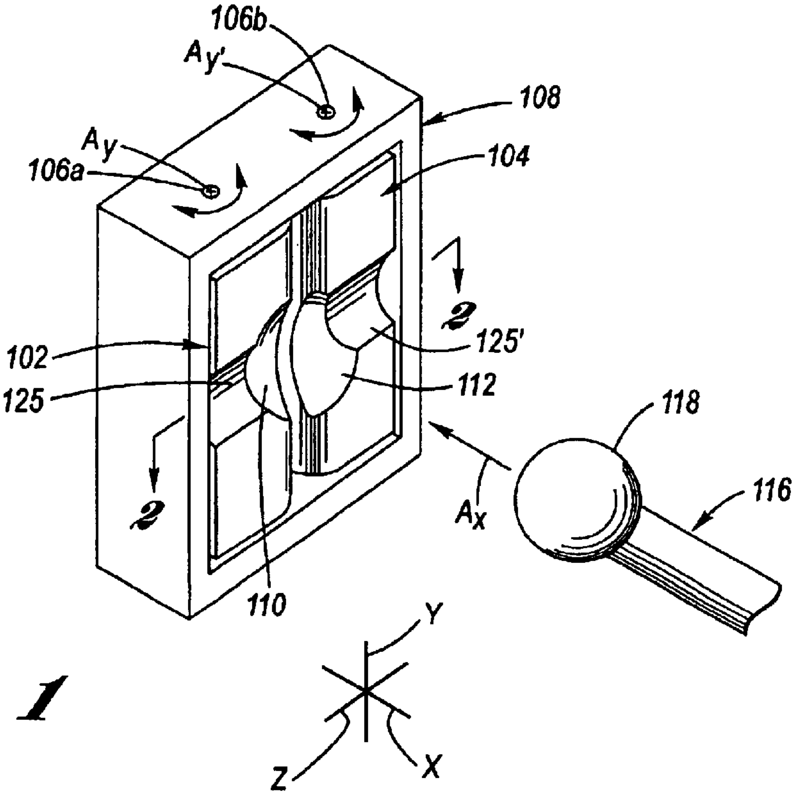
FIG. 1 is a perspective view of a striker and asymmetrical socket rollers load latch according to the present invention, wherein the lock ball of the striker is separated from the socket rollers.

Referring now to the Drawing, FIGS. 1 through 4 depict an operational overview of the ball and socket rollers load latch mechanism 100 according to the present invention.

A pair of mutually adjacent socket rollers 102, 104 is provided, wherein each socket roller rotates on a respective roller axle 106*a*, 106*b*, and wherein each end of each roller axle is connected to a rollers retainer 108. The rollers retainer 108 is, in turn, connected to a first component, as for example a frame of a motor vehicle. The rotation of each socket roller 102, 104 is about a respective rotation axis $A_Y$, $A_Y'$ that is parallel to a first axis Y (see FIG. 1).

Each socket roller 102, 104 has a hemispherically shaped semi-socket 110, 112, wherein rotation of the socket rollers provides a complementing conjoinder of the semi-sockets, whereupon the two semi-sockets collectively provide a spherically shaped lock socket 114. In this regard, the socket rollers 102, 104 rotate from an open socket position, as shown at FIGS. 1 and 2, to a closed socket position as shown at FIGS. 3 and 4, whereat the aforementioned lock socket 114 is formed collectively of the semi-sockets 110, 112.

A striker 116 has a spherically shaped lock ball 118 formed at a distal end thereof. Opposite the distal end, the striker is connected to a second component, for example an automotive door. The semi-sockets 110, 112 are sized to match the lock ball 118, in that the spherical surface 114*s* of the lock socket 114 is closely matched in a snug, complementary manner to the spherical surface 118*s* of the lock ball. A groove 125, 125' is formed on the distal side of each of the semi-sockets 110, 112, so that at the closed socket position, as shown at FIGS. 3 and 4, there is spatial accommodation of the striker 116.

Figure 2:
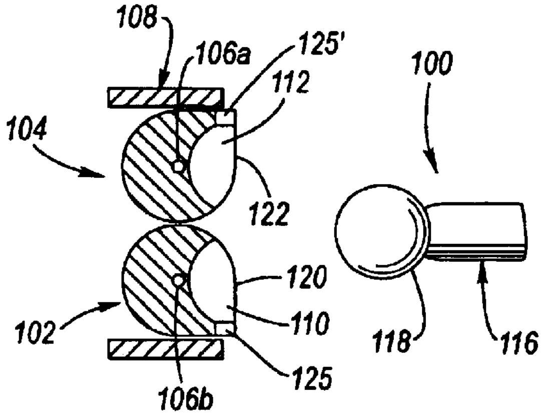
FIG. 2 is a partly sectional view of the striker and socket rollers, as seen at FIG. 1.
Figure 3:
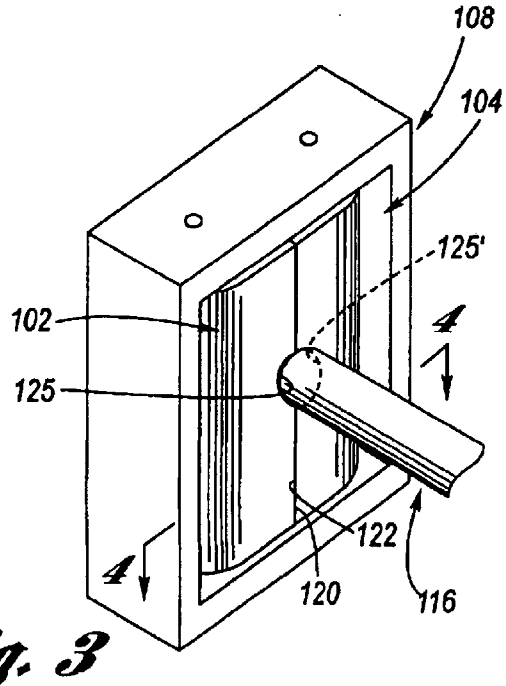
FIG. 3 is a perspective view of a striker and asymmetrical socket rollers load latch as in FIGS. 1 and 2, wherein now the lock ball of the striker is engaged with a lock socket formed by rotation of the socket rollers.

Operatively, the lock ball 118 of the striker 116 is, as shown at FIGS. 1 and 2, initially separated from the socket rollers 102, 104, and the socket rollers 102, 104 are in the socket open position, whereat each semi-socket is freely open in the direction of a striking axis $A_x$ which is parallel to a second axis X, wherein the striking axis is the direction of movement of the striker perpendicular to the rotation axes. As the striker moves along the striker axis toward the socket rollers, the lock ball contactingly interacts with the semi-sockets. This interaction causes the socket rollers to rotate such that the semi-sockets move into mutual complement, whereupon the socket rollers are at the socket closed position and the lock socket 114 is formed. As shown at FIGS. 3 and 4, the lock ball 118 is now trapped in the lock socket 114. As a consequence, a first component (not shown) connected to the rollers retainer 108 is located relative to a second component (not shown) connected to the striker 116 and prevented from movement relative to the first component in at least two mutually perpendicular dimensional axes Y, Z.

Figure 4:
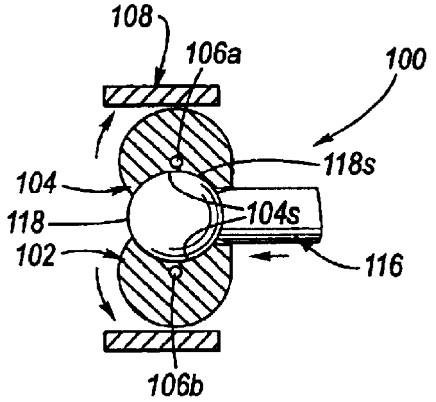
FIG. 4 is a partly sectional view of the striker and socket rollers, as seen at FIG. 3.

Since the socket rollers 102, 104 are asymmetric, the flats 120, 122 are placed so that they mutually abut when at the socket closed position of FIG. 4. The abutment of the flats 120, 122 prevents further rotation of the socket rollers 102, 104 (in other words, the flats "bottom-out" and stop "over rotation") such that the striker 116 can advance no further toward the rollers retainer and socket rollers.

Thereafter, the lock ball can recede from the rollers retainer and socket rollers only if the socket rollers reverse rotate so as to release the lock ball, whereupon the semi-sockets are again at the socket open position of FIGS. 1 and 2. In order that the first and second components be located in all three dimensions X, Y, Z, the socket rollers 102, 104 need to be prevented from reverse rotating.

Figure 5A:
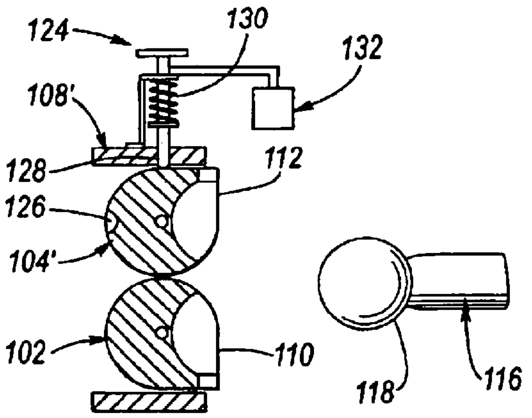
FIGS. 5A through 5C are a series of partly sectional side views of lock ball engagement with asymmetrical socket rollers according to an aspect of the present invention, wherein a detent mechanism selectively controls entrapment of the lock ball in the lock socket.
Figure 5B:
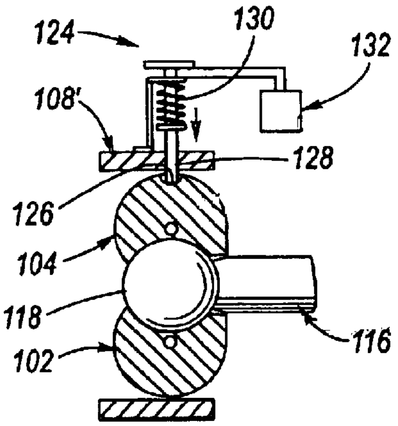
Figure 5C:
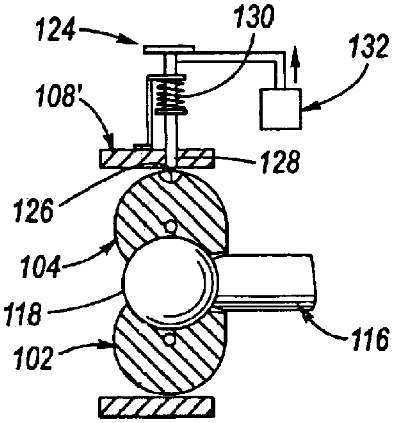

Referring now to FIGS. 5A through 5C, an example of a detent mechanism 124 will be described which selectively prevents the socket rollers from rotating. In this regard, a socket roller 104' is provided with an external indentation 126. The detent mechanism 124 is connected to the rollers retainer 108' and has a pin 128 which passes through the rollers retainer and interferingly engages the indentation 126 (see FIG. 5B) at the closed socket position. The pin 126 may be biased toward the indentation by a spring 130, and an external actuator 132 may be used to lift the pin from the indentation when it is desired to release the lock ball 118 from the lock socket 114.

Figure 6A:
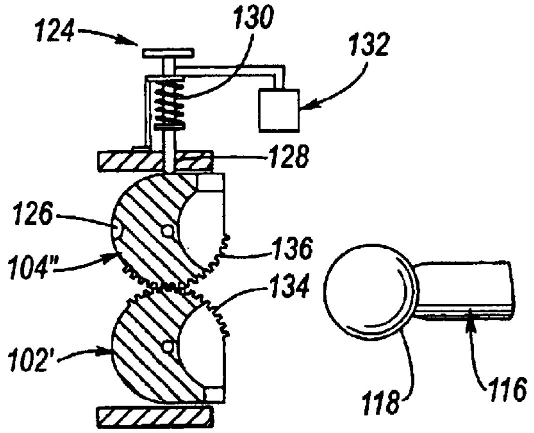
FIGS. 6A and 6B are a series of partly sectional side views similar to FIGS. 5A and 5B, wherein now the asymmetrical socket rollers are splined.
Figure 6B:
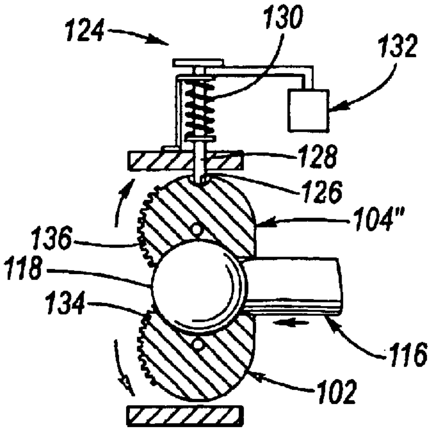

FIGS. 6A and 6B depict a variation of the foregoing, wherein the socket rollers 102', 104" are now provided with splines 134, 136 which gearingly interface with each other. Accordingly, in the operational scenario detailed with respect to FIGS. 5A through 5C, when the pin 128 of the detent mechanism 124 engages the indentation 126, even though one socket roller 104" is so engaged, both socket rollers 102', 104" are frozen from rotation by the gearing engagement of the splines 134, 136.

Figure 7A:
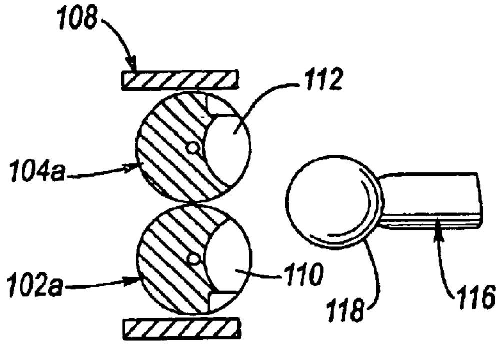
FIGS. 7A and 7B are a series of partly sectional side views similar to FIGS. 5A and 5B, wherein now the socket rollers are symmetrical.
Figure 7B:
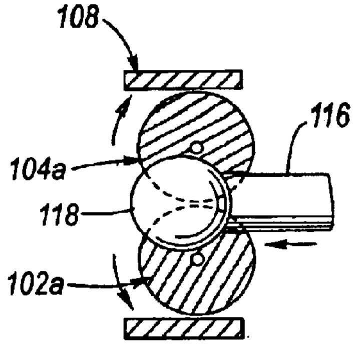

Turning attention now to FIGS. 7A and 7B, which depict views similar to FIGS. 2 and 4 with like numbers identifying like parts, it will be noted that the socket rollers 102*a*, 104*a* are now symmetrical, that is, circularly cylindrical, as opposed to the asymmetrical shape previously shown and described. Because the socket rollers 102*a*, 104*a* are symmetrical, they are capable of 360 degree rotation without bottoming out, the rotation of the socket rollers being responsive simply to the movements of the lock ball of the striker.

Figure 8:
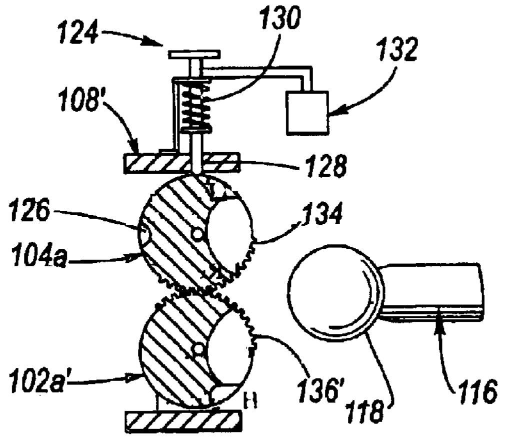
FIG. 8 is a partly sectional side view similar to FIG. 6A, wherein now the splined socket rollers are symmetrical.

FIG. 8 depicts a view similar to FIG. 6A with like numbers identifying like parts, except now a socket roller 104*a*' is provided with the aforedescribed detent mechanism 124 so as to prevent rotation when the pin 128 is engaged in the indentation 126. As an additional aspect, the symmetrical socket rollers 102*a*', 104*a*' are provided with gearlingly engaged splines 134', 136' operating on the principles described with respect to FIGS. 6A and 6B.

Figure 9A:
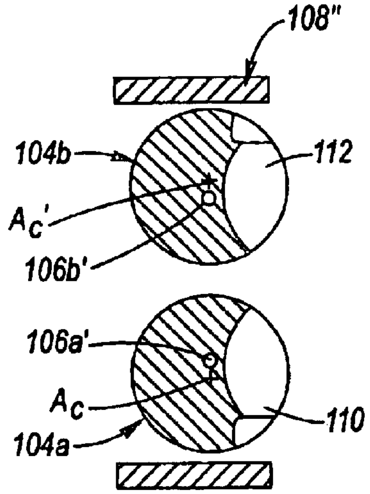
FIGS. 9A and 9B are a series of partly sectional side views of symmetrical socket rollers similar to FIGS. 7A and 7B, wherein now the socket rollers have off-set rotation axes and cam toward each other as they approach the closed socket position.
Figure 9B:
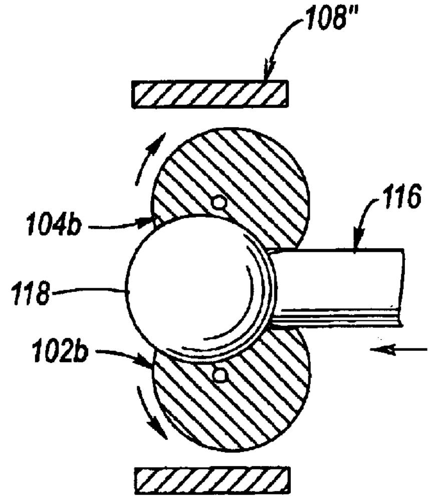

FIGS. 9A and 9B depict socket rollers 102*b*, 104*b* which have the roller axles 106*a*', 106*b*' mounted to the rollers retainer 108" off-set in relation to the circular cylindrical axes $A_C$, $A_C'$ of the socket rollers, respectively. As a consequence, as the socket rollers 102*b*, 104*b* rotate due to movement of the striker 116, the socket rollers cam toward each other as they reach the closed socket position of FIG. 9B. When cammed together, the semi-sockets 110, 112 press upon the lock ball 118.

Figure 10:
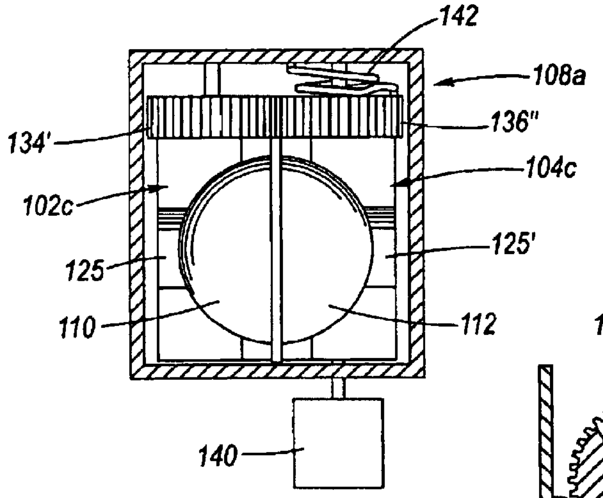
FIG. 10 is a front elevational view of splined symmetrical socket rollers which are spring loaded and motor driven.

Moving on now to FIG. 10, a pair of socket rollers 102*c*, 104*c* are rotatably connected to a rollers retainer 108*a*, wherein the socket rollers are gearingly joined by splines 134", 136" and one of the socket rollers 104*c* is rotatably driven by an electric motor 140. Because of the splines 134', 136', the motor 140 drives both socket rollers 102*c*, 104*c*. The motor can have its own gearing and controls so as to provide a rotation lock for the socket rollers in the sense of the aforedescribed detent mechanism. Additional to, or independent of, the motor 140 is a drive spring 142 which is connected between the rollers retainer 108*a* and a socket roller 104*c* so as to bias the socket rollers to a predetermined position, as for example the open socket position or the closed socket position.

Figure 11:
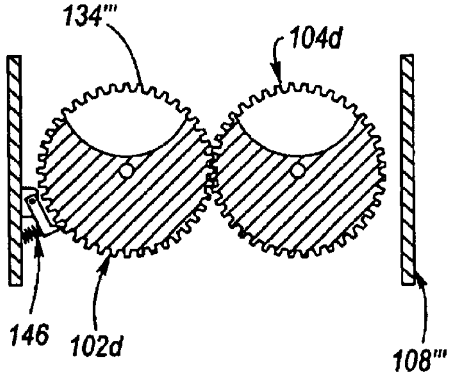
FIG. 11 is partly section side view of splined symmetrical socket rollers having a ratchet regulator.

Turning attention to FIG. 11, a pair of splined symmetrical socket rollers 102*d*, 104*d*, are now rotatably regulated by a spring biased ratchet mechanism 146 ratchetably engaging a spline 134'". The ratchet mechanism 146 keeps the rotative position of the socket rollers from reverse rotating at any movement of the striker. A release actuator (for example, not unlike that described above with respect to the detent mechanism) can serve to release the ratchet mechanism 146 should it be desired to release the lock ball from the lock socket.

Figure 12A:
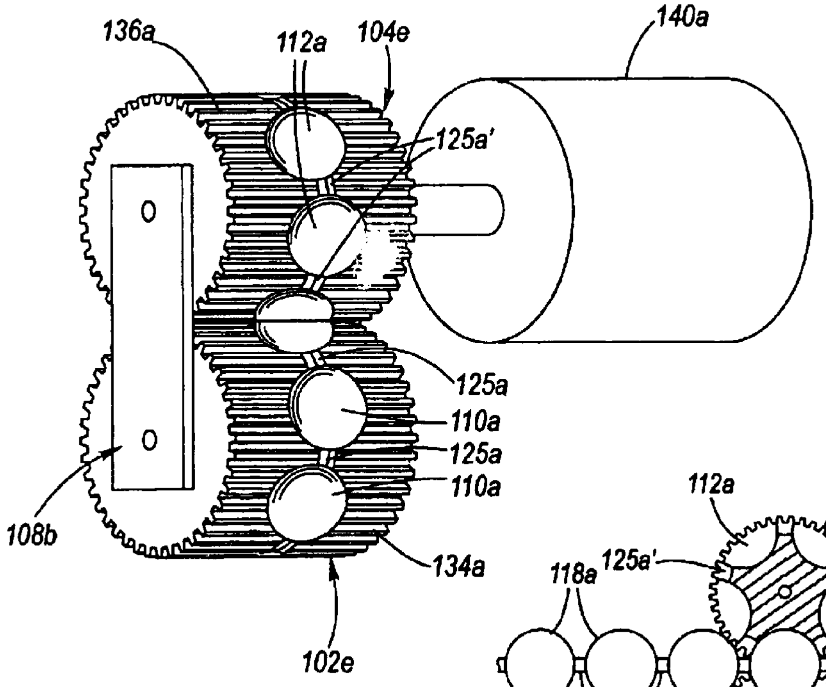
FIG. 12A is a perspective view of a motor driven set of splined symmetrical socket rollers adapted for receiving a serially balled striker.
Figure 12B:
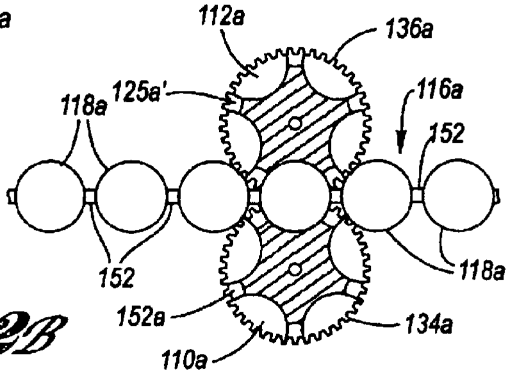
FIG. 12B is a partly sectional side view of the socket rollers of FIG. 12A now engaged with a serially balled striker according to the present invention.

Finally, FIGS. 12A and 12*b* depict a variation on the above discussion. Now, splined symmetrical socket rollers 102*e*, 104*e* are rotatably mounted on a rollers retainer 108*b*. The socket rollers 102*e*, 104*e* respectively have a plurality of semi-sockets 110*a*, 112*a* formed therein serially thereabout, each semi-socket being interconnected by a groove 125*a*, 125*a*'. The socket rollers 102*e*, 104*e* are gearingly joined by splines 134*a*, 136*a* and driven by a motor 140*a*. The striker 116*a* is now in the form of a series of lock balls 118*a* connected by links 152 which may be flexible or inflexible.

In operation, as the socket rollers 102*e*, 104*e* rotate, a lock ball 118*a* is received into each forming lock socket 114*a* and the links 152 are respectively received by the grooves 150. Accordingly, the striker is movably driven forward or backward as the socket rollers rotate in the analogous sense of a chain and sprocket drive.

Additional variations on the ball and socket rollers principles outlined above may occur to those having ordinary skills in the related art. For example, an ordinary artisan could envision a conveyance device which operates in the manner of FIGS. 1 through 4, wherein the rollers retainer grips the striker, moves from one location to another, and then deposits the striker thereat.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A ball and socket rollers load latch mechanism comprising:

a first socket roller having a first planar end and an opposite second planar end, a first semi-socket being formed therein between said first and second ends thereof;

a second socket roller having a first planar end and an opposite second planar end, a second semi-socket being formed therein between said first and second ends thereof;

a rollers retainer, said first and second socket rollers being rotatably connected to said rollers retainer at said first and second ends, respectively, thereof, wherein said first and second socket rollers are mutually adjacent, wherein each of said first and second socket rollers respectively rotates on a mutually parallel rotation axis, and wherein the rotation axis of the first socket roller is adjacent said first semi-socket, and wherein the rotation axis of the second socket roller is adjacent said second semi-socket; and a lock ball movable along a striking axis which is perpendicular to said rotation axes;

wherein rotation of said first and second socket rollers is between at least a socket open position and a socket closed position, wherein at said socket closed position said first and second semi-sockets collectively form a lock socket, wherein said lock ball is receivably trapped in said lock socket in substantially tight relation thereto by said lock ball being received by said first and second semi-sockets as said first and second socket rollers rotate from said open socket position to said closed socket position; and wherein said rollers retainer substantially abuts said first and second ends of said first and second socket rollers, respectively, at an intersection of an imaginary line oriented parallel to the rotation axes and passing through said lock socket.

2. The load latch mechanism of claim 1, wherein said first and second socket rollers are splined in mutually geared relationship.

3. The load latch mechanism of claim 2, further comprising a ratchet mechanism engaged with the splines of at least one of said first and second socket rollers, wherein said ratchet mechanism permits a single direction of rotation of said first and second socket rollers.

4. The load latch mechanism of claim 2, further comprising a motor connected to at least one of said first and second socket rollers, wherein said motor drivably rotates said first and second socket rollers.

5. The load latch mechanism of claim 1, wherein said first and second socket rollers have an asymmetrical shape such that upon said first and second socket rollers rotating into said closed socket position, said first and second socket rollers interferingly abut each other, thereby preventing further rotation of said first and second socket rollers.

6. The load latch mechanism of claim 1, wherein said first and second socket rollers are rotatably mounted to said rollers retainer in a mutually off-set relationship such that as said first and second socket rollers rotate into said socket closed position, said first and second rollers cam toward each other.

7. The load latch mechanism of claim 1, further comprising a detent mechanism connected with said rollers retainer and interfaced with at least one of said first and second socket rollers so as to selectively prevent rotation of said as least one of said first and second lock rollers when said first and second socket rollers are at said closed socket position.

8. The load latch mechanism of claim 1, further comprising a spring connected with said rollers retainer and at least one of said first and second socket rollers for biasing said first and second socket rollers into a selected one of said open socket position and said closed socket position.

9. The load latch mechanism of claim 1, wherein said lock ball is connected to a striker; wherein said first socket roller has a first groove formed therein adjacent said first semi-socket; wherein said second socket roller has a second groove formed therein adjacent said second semi-socket; and wherein said first and second grooves collectively form an accommodation space for said striker when said first and second roller sockets are at said closed socket position.

10. The load latch mechanism of claim 1, wherein said first and second semi-sockets are hemispherically shaped, wherein said lock socket is spherically shaped, and wherein said lock ball is spherically shaped.

11. A ball and socket rollers load latch mechanism comprising:

a first socket roller having a first planar end and an opposite second planar end, a first semi-socket being formed therein between said first and second ends thereof, said first socket roller further having a first groove formed adjacent said first semi-socket;

a second socket roller having a first planar end and an opposite second planar end, a second semi-socket being formed therein between said first and second ends thereof, said second socket roller further having a second groove formed adjacent said second semi-socket;

a rollers retainer, said first and second socket rollers being rotatably connected to said rollers retainer at said first and second ends respectively thereof, wherein said first and second socket rollers are mutually adjacent in mutually geared relationship, wherein each of said first and second socket rollers respectively rotates on a mutually parallel rotation axis, and wherein the rotation axis of the first socket roller is adjacent said first semi-socket, and wherein the rotation axis of the second socket roller is adjacent said second semi-socket; and a striker having a lock ball, said lock ball being movable along a striking axis which is perpendicular to said rotation axes;

wherein rotation of said first and second socket rollers is between at least a socket open position and a socket closed position, wherein at said socket closed position said first and second semi-sockets collectively form a lock socket, wherein said lock ball is receivably trapped in said lock socket in substantially tight relation thereto by said lock ball being received by said first and second semi-sockets as said first and second socket rollers rotate from said open socket position to said closed socket position;

wherein said rollers retainer substantially abuts said first and second ends of said first and second socket rollers, respectively, at an intersection of an imaginary line oriented parallel to the rotation axes arid passing through said lock socket;

wherein said first and second socket rollers have an asymmetrical shape such that upon said first and second socket rollers rotating into said closed socket position, said first and second socket rollers interferingly abut each other, thereby preventing further rotation of said first and second socket rollers; and wherein said first and second grooves collectively form an accommodation space for said striker when said first and second roller sockets are at said closed socket position.

12. The load latch mechanism of claim 11, wherein said first and second socket rollers are splined in mutually geared relationship.

13. The load latch mechanism of claim 12, further comprising a ratchet mechanism engaged with the splines of at least one of said first and second socket rollers, wherein said ratchet mechanism permits a single direction of rotation of said first and second socket rollers.

14. The load latch mechanism of claim 12, further comprising a motor connected to at least one of said first and second socket rollers, wherein said motor drivably rotates said first and second socket rollers.

15. The load latch mechanism of claim 11, wherein said first and second socket rollers are rotatably mounted to said rollers retainer in a mutually off-set relationship such that as said first and second socket rollers rotate into said socket closed position, said first and second rollers cam toward each other.

16. The load latch mechanism of claim 11, further comprising a detent mechanism connected with said rollers retainer end interfaced with at least one of said first and second socket rollers so as to selectively prevent rotation of said at least one of said first and second lock rollers when said first and second lock rollers are at said closed socket position.

17. The load latch mechanism of claim 11, further comprising a spring connected with said rollers retainer and at least one of said first and second socket rollers for biasing said first and second socket rollers into a selected one of said open socket position and said closed socket position.

* * * * *